(12) United States Patent
Merkel et al.

(10) Patent No.: US 9,860,774 B2
(45) Date of Patent: Jan. 2, 2018

(54) TEST APPARATUS, RADIO COMMUNICATION TEST APPARATUS, METHOD FOR TESTING AND COMPUTER PROGRAM PRODUCT

(71) Applicant: Rohde & Schwarz GmbH & Co. KG, München (DE)

(72) Inventors: Sandra Merkel, München (DE); Pirmin Seebacher, Rosenheim (DE); Uwe Bäder, Erding (DE); Andreas Roessler, Keller, TX (US)

(73) Assignee: Rohde & Schwarz GmbH & Co. KG, München (DE)

( * ) Notice: Subject to any disclaimer, the term of this patent is extended or adjusted under 35 U.S.C. 154(b) by 0 days.

(21) Appl. No.: 14/829,195

(22) Filed: Aug. 18, 2015

(65) Prior Publication Data

US 2016/0050573 A1    Feb. 18, 2016

Related U.S. Application Data

(63) Continuation-in-part of application No. 14/462,217, filed on Aug. 18, 2014, now abandoned.

(51) Int. Cl.
*H04W 24/06* (2009.01)
*H04W 76/02* (2009.01)
*H04W 88/06* (2009.01)

(52) U.S. Cl.
CPC ......... *H04W 24/06* (2013.01); *H04W 76/023* (2013.01); *H04W 88/06* (2013.01)

(58) Field of Classification Search
CPC .................................................. H04W 24/06
See application file for complete search history.

(56) References Cited

U.S. PATENT DOCUMENTS 6,512,988 B1 * 1/2003 Kanago ............... G06F 11/2733
                                                                    702/123
2006/0176851 A1    8/2006 Bennett et al.
(Continued)

FOREIGN PATENT DOCUMENTS

DE    102008010300    3/2009
WO    WO 2012/082024    6/2012

OTHER PUBLICATIONS

Non-Final Office Action for U.S. Appl. No. 14/462,217 (dated Jan. 7, 2016).
(Continued)

*Primary Examiner* — Hsin-Chun Liao
(74) *Attorney, Agent, or Firm* — Jenkins, Wilson, Taylor & Hunt, P.A.

(57) ABSTRACT

The present invention relates to a for testing user equipment. The test apparatus comprises an emulation module which is configured to emulate the functionality of a first user equipment and to establish a D2D link between the first user equipment and an externally arranged second user equipment which forms a user equipment under test. The test apparatus also comprises a test module which is configured to test at least one second user equipment after being connected to the emulated first user equipment of the emulation module via the established D2D communication link. The present invention further relates to a radio communication test apparatus, a method for testing user equipment and a computer program product.

30 Claims, 8 Drawing Sheets

(56) References Cited

U.S. PATENT DOCUMENTS

| | | |
|---|---|---|
| 2008/0026748 A1 | 1/2008 | Alexander et al. |
| 2010/0332213 A1 | 12/2010 | Okamiya |
| 2013/0273907 A1 | 10/2013 | Vikberg et al. |
| 2015/0229426 A1* | 8/2015 | Yu .......................... H04B 7/026 370/329 |
| 2016/0050572 A1 | 2/2016 | Merkel et al. |

OTHER PUBLICATIONS

Feng, "Device-to-Device Communications in LTE-Advanced Network," Networking and Internet Architecture (2013).

* cited by examiner

TEST APPARATUS, RADIO COMMUNICATION TEST APPARATUS, METHOD FOR TESTING AND COMPUTER PROGRAM PRODUCT

CROSS REFERENCE TO RELATED APPLICATIONS

This application is a continuation-in-part of U.S. patent application Ser. No. 14/462,217, filed on Aug. 18, 2014, the contents of which are incorporated by reference in their entirety.

FIELD OF THE INVENTION

The present invention relates to a test apparatus and a radio communication test apparatus for testing user equipment. The present invention further relates to a method for testing and a computer program product.

TECHNICAL BACKGROUND

In LTE (long term evolution) and UMTS (universal mobile telecommunications system), these devices are denoted as user equipment or shortly UE. Hereinafter, the present invention and its underlying problem are described on the basis of such user equipment, however, without restricting the invention to this sort of devices. In particular, the term user equipment should be used in the context of this application explicitly for any radio-based mobile or wireless end-to-end communication device, such as a cell phone, a smart computer, a laptop computer equipped with a mobile broadband adapter or the like.

The growing functionality of modern user equipment gives rise to testing these devices. If a user equipment is tested in a real environment, such as a real radio communications network, the conditions are often not reproducible due to the limiting conditions such as cell capacity, timing, utilisation, etc. In this respect it makes sense to test user equipment in a reproducible test environment. For this purpose, dedicated test apparatus—also denoted as test devices or test instruments—for testing such user equipment exist. Such test apparatus are used to test user equipment by measuring physical parameters or transmitted signals. DE 10 2008 010 300 A1, for example, describes the operating principle of a test apparatus of this type.

Such a test apparatus is in principle an RF test station, which is a modified small transceiver base station of a mobile communications network. The test apparatus can emulate a specific test network according to the required mobile communications standard such as for example a GSM, UMTS or LTE network, so that the test can be performed under realistic conditions. This type of test apparatus is used in order to test the RF properties of a user equipment under test, for instance its transmit and receive capability, or whether a particular user equipment is behaving as required, for example with regard to data throughput, data volume, communications partners (servers), etc.

More and more communication is related to communication in a mixed cellular and Device-to-Device (D2D) communications environment. In particular, D2D communication has been promoted as a means to provide peer-to-peer services between user equipments, facilitate infrastructureless communications in emergency situations and to enhance network capacity by offloading traffic from the radio communications network. WO 2012/082024 A1, for example, describes such a D2D communication.

Current test apparatus are capable to emulate the functionality of a common transceiver base station only. However, with the upcoming D2D communication capabilities of user equipments, the need arises to test the user equipment under these conditions, too.

SUMMARY OF THE INVENTION

According to a first aspect of the present invention, a test apparatus is provided, the test apparatus comprising: an emulation module which is configured to emulate the functionality of a first user equipment and to establish a D2D link between the emulated first user equipment and an externally arranged second user equipment which forms a user equipment under test; a test module which is configured to test at least one second user equipment after being connected to the emulated first user equipment of the emulation module via the established D2D link.

According to a second aspect of the present invention, a test apparatus radio communication test apparatus for testing user equipment is provided, the test apparatus comprising: an emulation module which is configured to emulate the functionality of a first user equipment and to establish a wireless D2D link between the emulated first user equipment and an externally arranged second user equipment which forms a user equipment under test; a test module which is configured to test at least one second user equipment after being connected to the emulated first user equipment of the emulation module via the established D2D link.

According to a third aspect of the present invention, a method for testing user equipment by employing a test apparatus is provided, the method comprising: emulating the functionality of a first user equipment; providing a second user equipment under test; establishing a wireless or wired D2D link between the emulated first user equipment and the second user equipment; after establishing the D2D link, testing the second user equipment.

According to a fourth aspect of the present invention, a computer program product is provided, the computer program product comprising instructions to perform testing a user equipment under test by emulating the functionality of a first user equipment, establishing a wireless or wired D2D link between the emulated first user equipment and a provided second user equipment under test and, after establishing the D2D link, testing the second user equipment. In one embodiment, the computer program product includes a non-transitory computer readable medium on which processor executable instructions are stored.

With the test apparatus and test method according to the present invention, it is now possible to test user equipment and other devices such as base stations also for the upcoming D2D communication standard. In particular, it is possible to test devices under test such as user equipment and measure their physical parameters and properties under various scenarios, such as full cellular coverage, partial cellular coverage and out-of coverage. This is done by employing specific emulation and test modules within the test apparatus. The emulation module is in particular capable to emulate the functionality of any user equipment and to provide for test purposes a D2D link from the emulated user equipment to any user equipment under test. The test module is then capable to test properties of the established D2D link and the corresponding functionality of the user equipment or devices under test.

Specific embodiments of the present invention are set forth in the dependent claims.

These and other aspects of the present invention will be apparent from and elucidated with reference to the embodiments described hereinafter.

CONTENTS OF THE DRAWINGS

For a more complete understanding of the present invention and advantages thereof, reference is now made to the following description taken in conjunction with the accompanying drawings. The invention is explained in more detail below using exemplary embodiments of the different aspects of the present invention which are specified in the schematic figures of the drawings in which:

FIG. 1A-1D schematically show four different mixed communications environments;

The enclosed drawings are intended to provide further understanding of the embodiments of the invention. They illustrate embodiments and, in conjunction with the description, serve to explain principles and concepts of the invention. Other embodiments and many of the stated advantages can be found from the drawings. The elements of the drawings are not necessarily shown in scale with one another.

In the figures of the drawing, any elements and components that are identical, have the same function and work in the same way, are each given the same reference signs, unless stated otherwise.

DESCRIPTION OF THE EMBODIMENTS

FIG. 1A-1D depict—as examples—four different mixed communications environments in which embodiments herein may be implemented. The mixed communications environment comprises a D2D radio network 1 and a cellular communications network 2, i.e. a mix of the D2D radio network 1 and the cellular communications network 2.

The D2D radio network 1 is a communication network wherein two or more user equipments 5, 6 or other devices, in the examples in FIGS. 1A-1D a first user equipment 5 and a second user equipment 6, communicate directly with each other and not via the cellular communications network 2. One such example is a network using a master-and-slave concept, such as e.g. a Bluetooth system. Another example is a D2D radio network based on LTE. The D2D radio network 1 may be used to provide peer-to-peer services between user equipments 5, 6, facilitate infrastructure-less communications in emergency, and the like. The D2D radio network 1 is established by two user equipments 5, 6 which are communicating with each other.

The cellular communications network 2 is established via at least one radio transceiver base stations 3, 4. The cellular communications network 2 is a cellular communication network such as an LTE, WCDMA, UMTS, GSM network, or any other cellular communications network. These networks may comprise base stations of different classes, such as macro base stations, home base stations or pico base stations.

The first and second user equipment 5, 6 may be a terminal, e.g. a mobile terminal or a wireless terminal, a mobile phone, a computer such as e.g. a laptop, Personal Digital Assistant (PDA), or any other radio network unit capable to communicate over a D2D link and over a radio link in a cellular communications system. Typically, but not necessarily, both first and second user equipment 5, 6 are capable of both communications, i.e. "macro" communications in the cellular communications network 2 and "local" D2D communications in the D2D radio network 1.

In the present patent application the term "D2D communication" shall refer as well to "D2D direct discovery" and "D2D direct communication". "D2D direct discovery" is related to the exchange of preknown, predefined and fix messages and data. "D2D direct communication" is related to a flexible data communication which comprises a sidelink (SL) control channel and a sidelink data channel.

In embodiments wherein the D2D radio network 1 uses a master-and-slave concept, one of the communicating user equipments 5, 6 takes the master role and closely emulates a base station such as LTE eNB. For example, the second user equipment 6 may be a master device and the first user equipment 5 may be a slave device, however, it may also be the other way around.

According to a first mixed communications environment (FIG. 1A), both user equipments 5, 6 are comprised in the cellular communications network 2. This scenario is hereinafter referred to as in-coverage, intra cell communication as both user equipments 5, 6 are fully comprised in the same cellular communications network 2. The first user equipment 5 is configured to communicate within the cellular communications network 2 via the base station 3 over a radio link 7 when the first user equipment 5 is present in a cell served by this base station 3. The base station 3 may e.g. be a radio base station such as an eNB, eNodeB. The first user equipment 5 is further arranged to communicate with the second user equipment 6 over a D2D radio link 8 within the D2D radio network 1. The second user equipment 6 may further be connected to the cellular communication system 2 via a connection 9. This connection 9 may serve for coordination of the whole communication.

According to a second mixed communications environment (FIG. 1B), the user equipments 5, 6 are comprised in different cellular communications network 2, 2a and thus connected to different base stations 3, 4. This scenario is hereinafter referred to as in-coverage, inter-cell communication. Here, the first user equipment 5 is arranged in a first cellular communications network 2 and communicates with a first cellular communications network 2 via radio link 7. A second user equipment 6 is arranged in a second, different cellular communications network 2a and communicates with the second cellular communications network 2a via connection 9. The user equipments 5, 6 are configured to communicate with each other via the D2D radio link 8.

According to a third mixed communications environment (FIG. 1C), both equipments 5, 6 are arranged outside any cellular communications network. This scenario is hereinafter referred to as out-of-coverage communication. Here, the both user equipments 5, 6 are arranged only within the D2D radio network 1. This D2D radio network 1 may be established by the first user equipment 5, the second equipment 6 or both of them. Thus, both user equipments 5, 6 are connected to each other only via the D2D radio link 8.

According to a fourth mixed communications environment (FIG. 1D), the first user equipment 5 is comprised in the cellular communications network 2 and the second user equipment 6 is comprised outside the cellular communications network 2. This scenario is hereinafter referred to as partial coverage communication. In this scenario, the second user equipment 6 is connected to the first user equipment 3 only via the D2D link 8. The first user equipment 5 is further connected to the base station 3 via the radio link 7. A link 9 between the base station 3 and the second user equipment serves only for data coordination purposes.

Figure 1A:
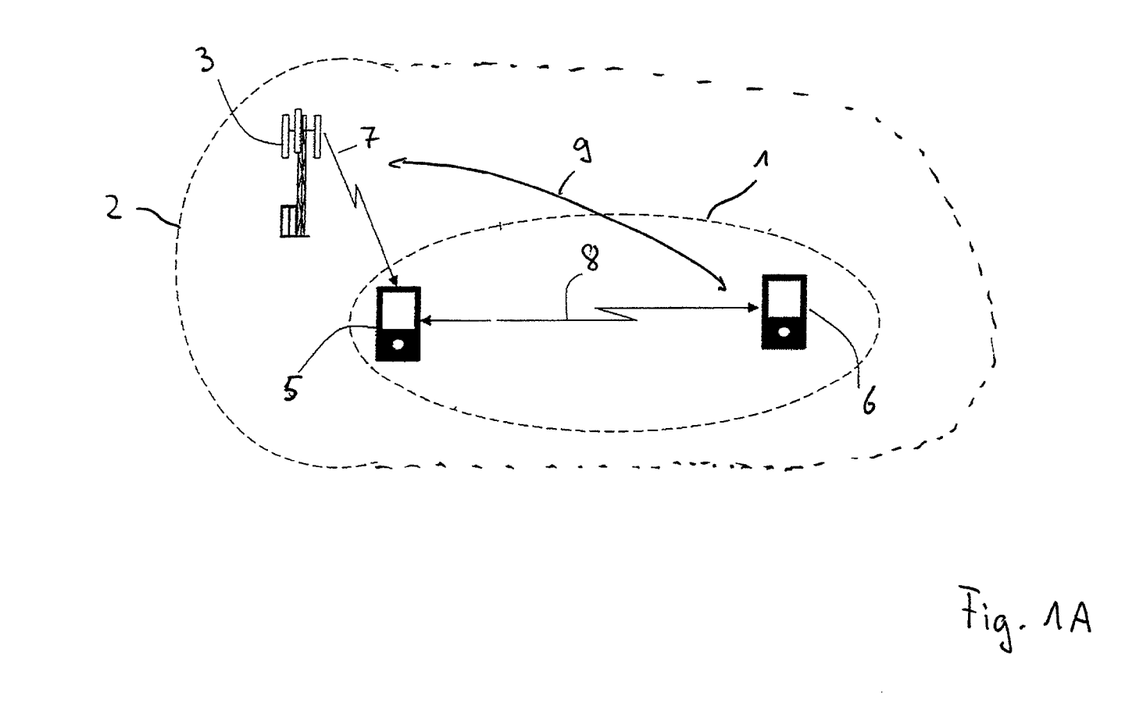
Figure 1B:
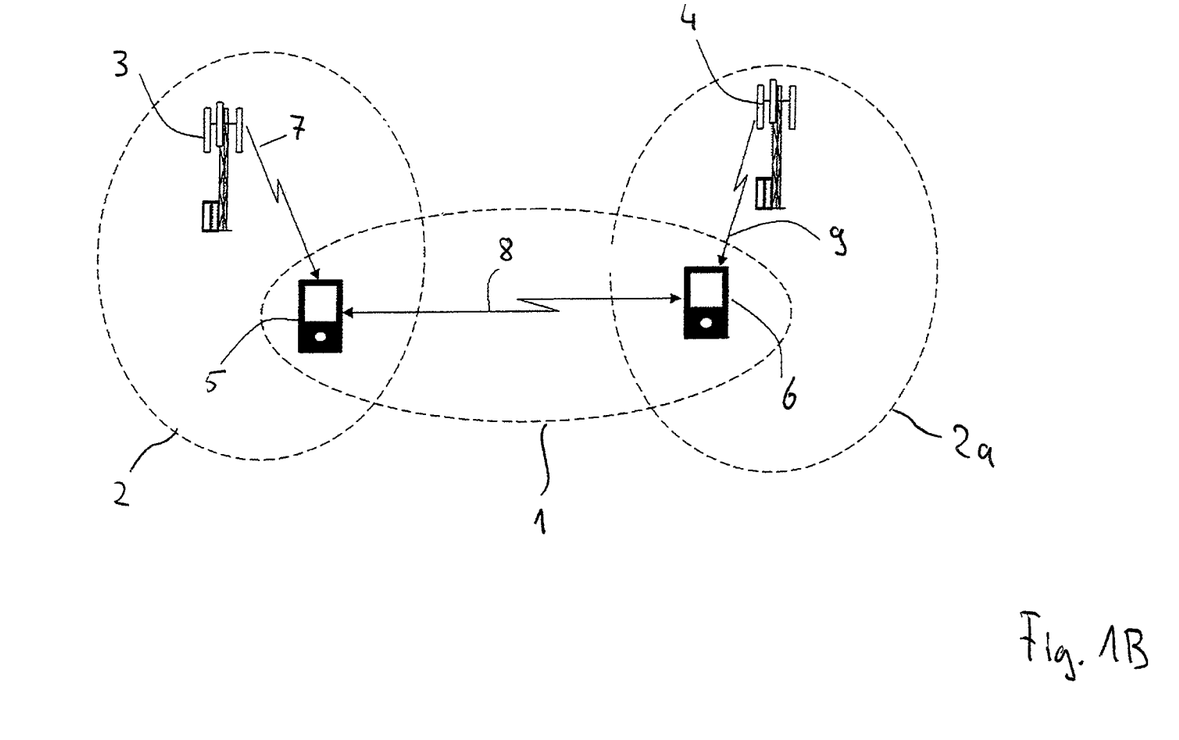
Figure 1C:
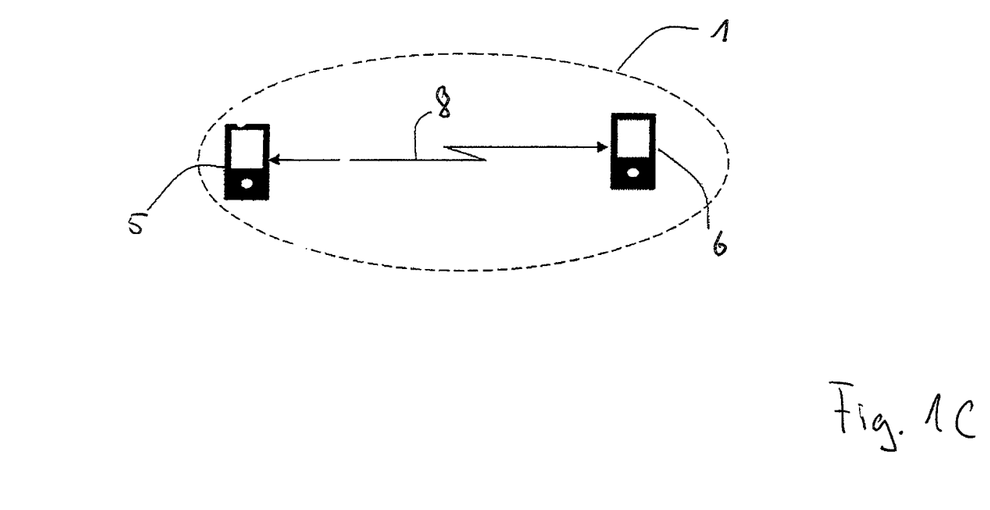
Figure 2:
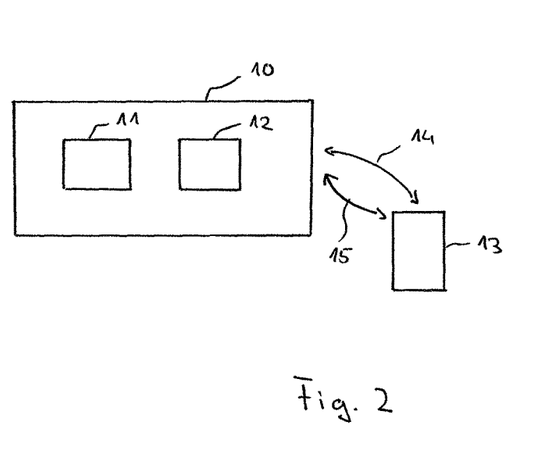
FIG. 2 schematically shows a block diagram of a test apparatus according to a specific aspect of the present invention.

FIG. 2 schematically shows a block diagram of a test apparatus according to a specific aspect of the present invention. In FIG. 2, the test apparatus is denoted by reference sign 10. The test apparatus 10 shown in FIG. 2 may be a radio communication test apparatus 10 for wireless testing, however, without restricting the invention to this sort of application. In other embodiments it may also be possible that the test apparatus 10 is designed to perform wired testing.

The radio communication test apparatus 10 shown in FIG. 2 constitutes a test station, which can also be referred to as an RF tester, user equipment tester, test equipment and the like. In addition to testing the pure mobile communications properties of a user equipment, the test apparatus 10 according to the invention may also designed to test IP properties of a user equipment or other devices such as base stations.

The test apparatus 10 comprises an emulation module 11 and a test module 12. The emulation module 11 and/or test module 12 are electrical devices within the test apparatus 10 or part thereof. In a preferred embodiment the emulation module 11 and/or test module 12 are—fully or partially—implemented in the form of a programmable circuit such as a micro-processor, micro-computer, PLD, FPGA, or the like. In a further specific embodiment the emulation module 11 and test module 12 are—fully or partially—implemented in the same programmable circuit.

In the embodiment of FIG. 2, the emulation module 11 is configured to emulate the functionality of a common user equipment which is capable to communicate with another user equipment 13 via a D2D link 14. For this purpose, the emulation module 11 is configured to establish a wireless D2D link 14 between the emulated user equipment and an externally arranged, real user equipment 13 which forms a device under test (DUT). The D2D link 14 between the test apparatus 10 and the user equipment 13 allows a bidirectional signal transfer between the two components 10, 13 of the test system.

In the embodiment of FIG. 2, the test module 12 is configured to test the externally arranged user equipment 13 if it is connected to the emulation module 11 and thus to the emulated user equipment via the established D2D link 14. The communication link 14 between the test apparatus 10 and the user equipment under test 13 allows a bidirectional signal transfer between the two components of the test system. The test module 12 is configured to measure and analyse the signal transfer of the data communication and especially the physical properties of the signal received from the user equipment 13. In order to properly conduct the measurement and analysis and hence not to negatively affect the signal transfer between user equipment 13 under test and test apparatus 10, the test module 12 is able to act merely as an observer.

In an additional embodiment, the emulation module 11 is also configured to emulate the functionality of a radio transceiver base station. This way, the emulation module 11 is configured to establish a radio communication link 15 between the emulated radio transceiver base station and the externally arranged user equipment 13. The communications standard used here is typically defined by the transceiver base station. In test mode, the emulation module of the test apparatus 10 according to the invention generates an RF test field in which the user equipment 13 is positioned. To test the pure mobile communications properties of the user equipment 13, it is merely necessary that the test apparatus 10 is connected to the user equipment 13 via the radio communication link 15.

Test communication between user equipment 13 and test apparatus 10 can be initiated by the user equipment 13 or by the test apparatus 10. By means of these connection 14 and 15, the test apparatus 10 can test and evaluate the properties of the user equipment 13 and in particular the D2D communication properties and radio communication properties as well as their interaction when used simultaneously.

For testing the mobile communication properties of the user equipment 13 under test, the signals captured by the test module 12 are measured and evaluated with respect to the parameters under investigation. For this purpose, the test module 12 comprises an RF measurement unit which is designed to test the RF properties of the user equipment 13 under test. An RF measurement unit within the test module 12 can be used for example to determine the RF resources needed in the mobile communications network over a defined time period. In addition, the quality of the radio interface 15 and D2D interface 14 between user equipment 13 and test apparatus 10 can be measured and evaluated.

In performing such an RF test, after connecting the test apparatus 10 to the user equipment 13, the specific test procedures and routines are carried out in order to verify in particular that the transmit and receive capability of the mobile communications terminal 3 complies with the specifications required for proper operability. The test involves testing for example the functionality and performance of the user equipment 13, the data transfer and, for example, also the interoperability with other UEs. During the test, the user equipment 13 under test receives, interprets and processes signals, and transmits back response signals which are detected by a receiver within the test module 12. The test module 12 interprets these signals and compares them with the expected values and signals.

A typical measurement and analysis as part of the RF test is the analysis of the bit error rate, which can be used to verify the functionality and quality of a radio transmission component of the user equipment 13. For example for this purpose, data is transmitted from the emulation module 11 to the user equipment 13, and then transmitted back again from the user equipment 13 to the test apparatus 1. This data can then be checked to ensure it has not been corrupted. Moreover, as a result, measurement results for different parameters can be displayed, stored and/or printed out in a test report. In particular, a simplified overall result of the test can also be output, for instance test passed or test not passed.

The test module 12 can be used to evaluate the data and signal sequences captured in a data transfer with regard to specific parameters.

In a specific embodiment, the test module 12 comprises a measurement unit that is designed to measure at least one of following items of information of the user equipment 13 under test:

power consumption of the user equipment 13 under test;
data volume produced by the user equipment 13 under test via the D2D link 14;
data volume produced by the user equipment 13 under test via a radio link 15;

frequency or spectrum information of the transferred data from the user equipment 13 under test via the D2D link 14;

frequency or spectrum information of the transferred data from the user equipment 13 under test via a radio link 15;

signalling behaviour;

synchronization behaviour.

Both, the communication over the D2D link 14 and the communication over the radio link 15 may be wireless or wired, preferably depending on the measuring purpose. E.g., for the test of higher protocol layers the communication will preferably be performed wired. For the test of specific RF properties and characteristics such as the direction of the antenna radiation, the communication will preferably be performed wireless.

In another specific embodiment, the test module 12 comprises an analysis or an evaluation unit which is/are designed to evaluate on the basis of specified parameters, signal sequences captured in a data transfer between the user equipment under test and the emulated user equipment and emulated radio transceiver base station.

In yet another specific embodiment, the test module comprises a protocol tester which is designed to test the protocols of the user equipment under test.

Test apparatus 10 include a variety of different types of test apparatus such as oscilloscopes, signal generators, signal analyzers, network analyzers or testing devices.

Figure 2A:
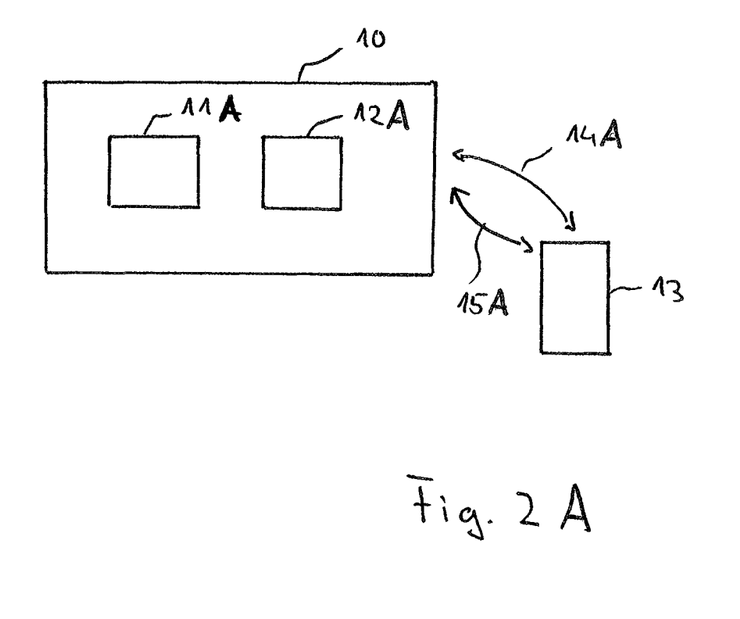
FIG. 2A schematically shows a block diagram of a test apparatus according to a further aspect of the present invention.

FIG. 2A schematically shows a block diagram of a test apparatus according to a further aspect of the present invention. In the embodiment shown in FIG. 2A the test apparatus 10 is configured to test user equipment via a wireless D2D link 14 and a wireless radio communication link 15. However, the present invention is not restricted to the wireless testing of devices under test such as mobile user equipment. In particular, in a further embodiment shown in FIG. 2A the test apparatus 10 is designed to test a device under test via wired connections 14A, 15A.

In the embodiment of FIG. 2, the emulation module 11A is configured to emulate the functionality of a user equipment which is capable to communicate with another user equipment 13 via a wired D2D link 14A. For this purpose, the emulation module 11 is configured to establish a wired D2D link 14A between the emulated user equipment and an externally arranged user equipment 13 which forms a device under test (DUT).

In the embodiment of FIG. 2, the test module 12A is configured to test the externally arranged user equipment 13 if it is connected to the emulation module 11A and thus to the emulated user equipment via the established wired D2D link 14A. The communication link 14A between the test apparatus 10 and the user equipment under test 13 allows a bidirectional signal transfer between the two components of the test system. The test module 12A is configured to measure and analyze the signal transfer of the data communication and especially the physical properties of the signal received from the user equipment 13.

In an additional embodiment, the emulation module 11A is also configured to emulate the functionality of a base station. This way, a wired link 15A between the emulated base station and the externally arranged user equipment 13 may be established.

Figure 3:
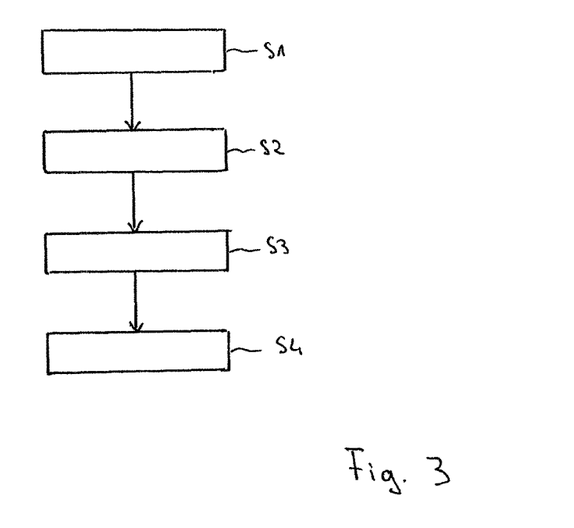
FIG. 3 schematically shows a flow-chart for illustrating the method for testing user equipment according to a specific aspect of the present invention.
Figure 4:
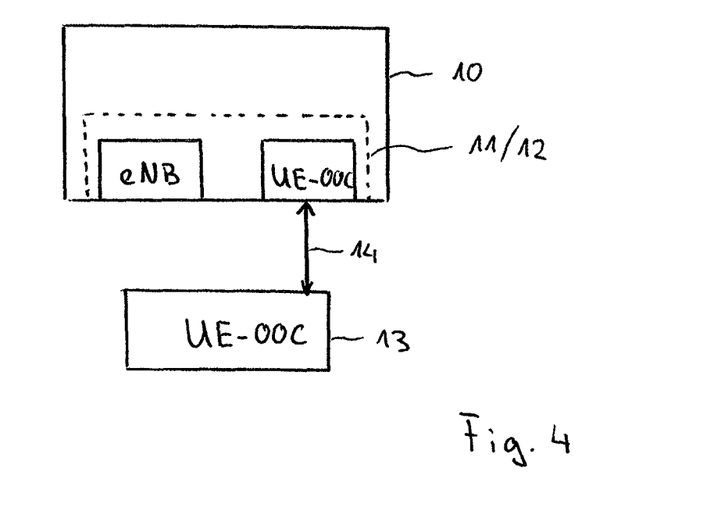
FIG. 4-7 schematically show different test scenarios for illustrating additional functions of the test apparatus according to aspects of the present invention.
Figure 4B:
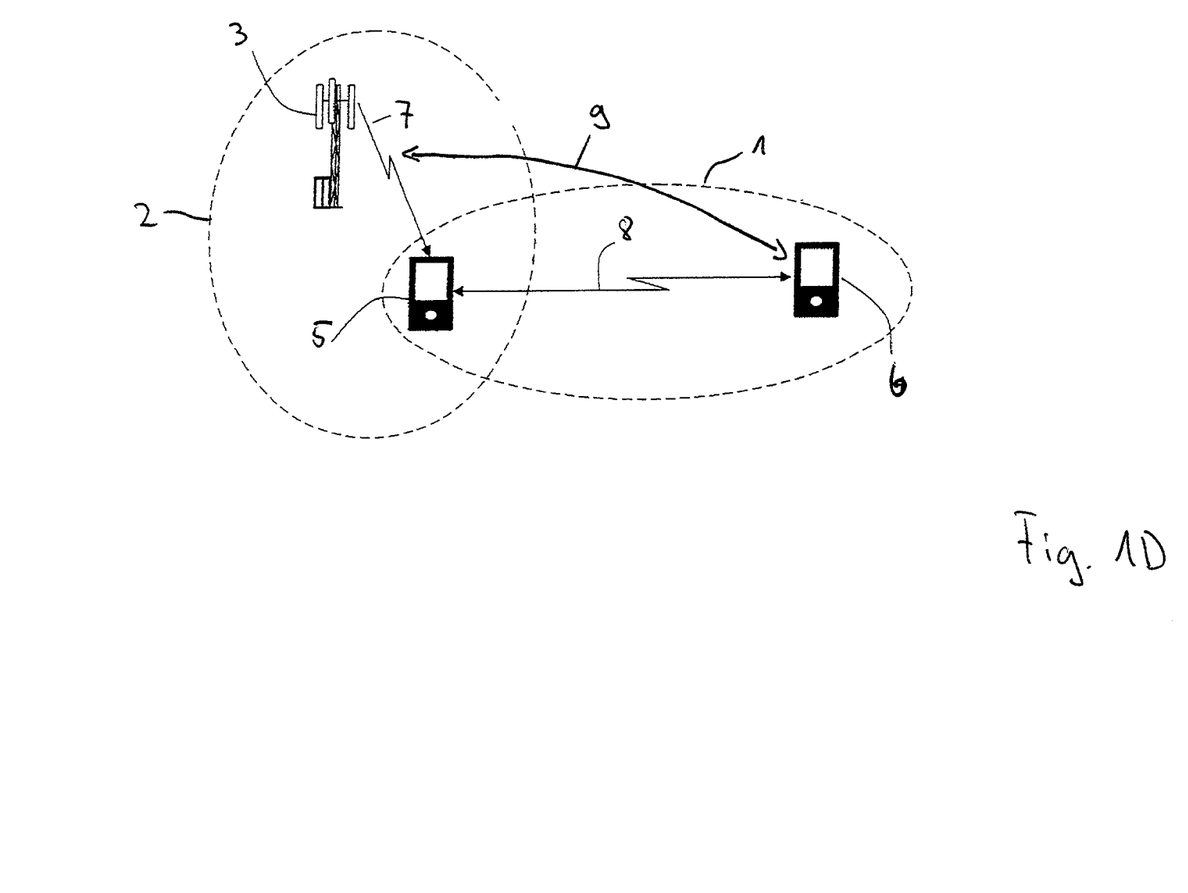
Figure 5:
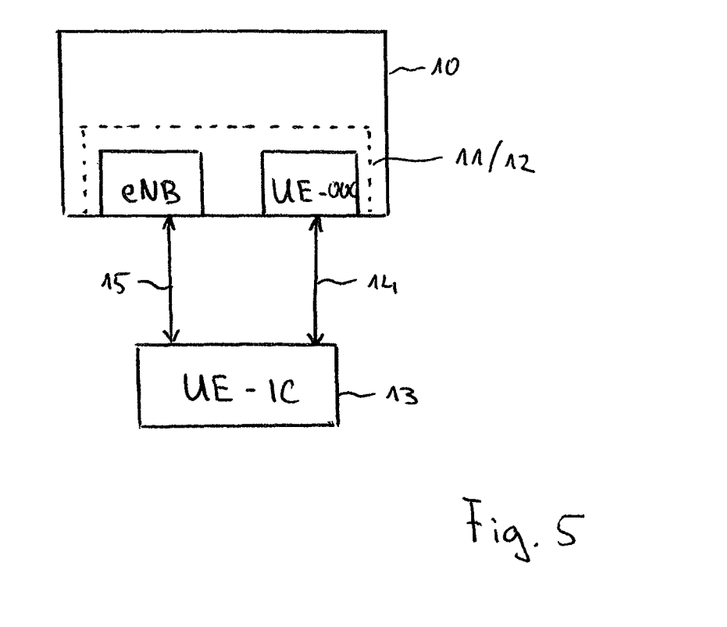
Figure 6:
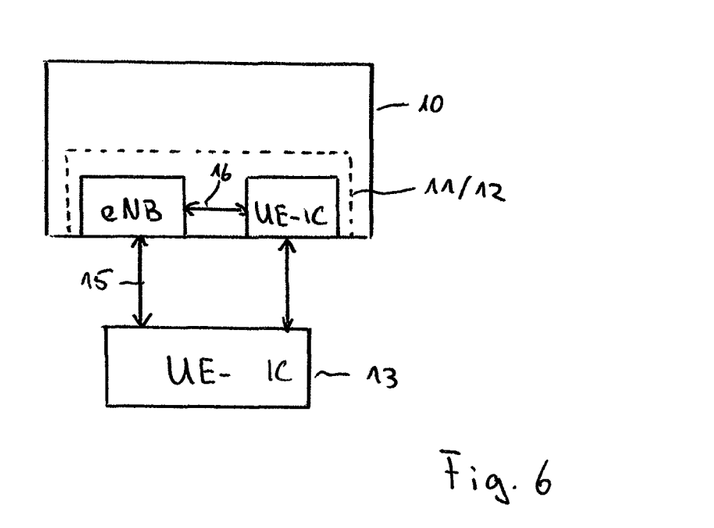
Figure 7:
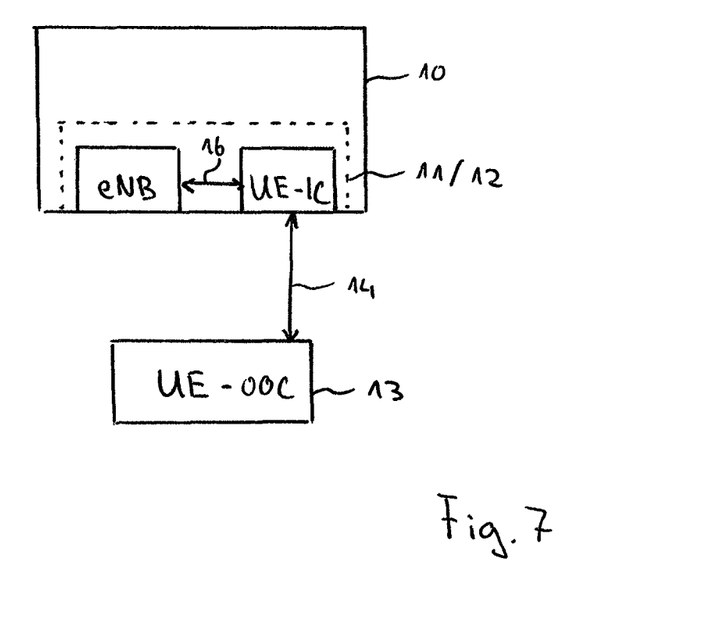

FIG. 3 schematically shows a flow chart for illustrating a method according to a specific aspect of the present invention. As can be seen in FIG. 3, a method for testing a user equipment by using a test apparatus, such as the one shown in FIG. 2 or FIG. 2A, can comprise in a possible embodiment four main steps:

In a first step S1, the functionality of a user equipment is emulated by the emulation module 11, 11A of a test apparatus 10.

Then, in a next step S2, a user equipment under test 13 is provided and preferably arranged in close proximity to the test apparatus 10.

Then, in subsequent step S3, a wireless or wired D2D link 14, 14A between the emulated user equipment and the provided user equipment under test 13 is established.

In a final step S4, after establishing the D2D link 14, 14A, the user equipment under test 13 is tested by using the test module 12, 12A of the test apparatus 10.

The emulation module 11, 11A and test module 12, 12A can be used to simulate various test scenarios. In particular, it is possible in this case to simulate, for instance, signal transfer between the user equipment 13 under test and the test apparatus 10 for different communication links and cellular scenarios. This will be shown hereinafter in FIG. 4-8 with regard to some particular embodiments:

According to a first test scenario (FIG. 4), the emulation module 11 within the test apparatus 10 is configured to emulate a user equipment UE-OOC in an out-of-coverage (OOC) mode such that a communication to an externally arranged user equipment under test 13 is based only on the D2D link 14. The test module 12 is then able to measure and analyse the signal transfer via this D2D link 14. This example to test a user equipment under test 13 corresponds to the mixed communications environment shown in FIG. 1C.

According to a second test scenario (FIG. 5), the emulation module 11 is again configured to emulate a user equipment UE-OOC in an out-of-coverage mode. Here, the emulation module 11 is further configured to emulate the functionality of a radio transceiver base station eNB and to establish a radio link 15 between the radio transceiver base station eNB and a user equipment under test 13. The emulation module 11 is further configured to emulate the user equipment UE-OOC and the radio transceiver base station eNB such that a communication between the emulated user equipment UE-OOC and a user equipment under test 13 is based on the D2D link 14 and the radio link 15 between the emulated radio transceiver base station eNB and the user equipment under test 13. This example to test a user equipment under test corresponds to the mixed communications environment shown in FIG. 1D.

According to a third test scenario (FIG. 6), the emulation module 11 is further configured to emulate the functionality of a radio transceiver base station eNB and to establish a radio link 15 between the radio transceiver base station eNB and a user equipment under test 13. The emulation module 11 is configured to emulate a user equipment UE-IC in an in-coverage (IC) mode in which the emulated user equipment UE-IC is connected to the emulated transceiver base station eNB internally via an internal link 16. This internal link 16 serves to synchronise and coordinate the communication between the emulated base station eNB, emulated user equipment UE-IC and user equipment under test 13. This example to test a user equipment under test corresponds to the mixed communications environment shown in FIG. 1A.

According to a fourth test scenario (FIG. 7), the emulation module 13 is again configured to emulate the functionality of a radio transceiver base station eNB. However, in this embodiment no radio link 15 is established between the radio transceiver base station eNB and the user equipment under test 13 as the user equipment under test 13 is in an out-of-coverage mode. Thus, the emulation module 11 is configured to emulate the emulated user equipment UE-IC and the emulated transceiver base station eNB such that a direct communication to the user equipment under test 13 is based only on the D2D link 14. This example to test a user equipment under test 13 corresponds to the mixed communications environment is again shown in FIG. 1D.

It is to be understood, that the preceding scenarios should be understood to be only exemplary. There may be various additional scenarios in which the test apparatus 10 may be used, such as:

In one scenario, the emulation module 11, 11A is configured to establish at least one of:
 a D2D direct communication link 14, 14A;
 a D2D direct discovery link 14, 14A.

According to a further scenario, the emulation module 11, 11A is configured to emulate the functionality of the first user equipment and at least one further user equipment. During test mode, this further user equipment may be used as a synchronizing source, for example for the device under test 13.

The above test scenarios—in particular the test scenarios shown in FIG. 4-7—are described on the basis of the testing of user equipment 13. However, it should be understood that the functionality of the test apparatus is not restricted to this application and may be used to the test of any device under test, e.g. such as the test of base stations.

In particular, according to a still further scenario, the test module 12, 12A is configured to test a radio transceiver base station. This radio transceiver base station may be connected to the second user equipment e.g. in an inter cell coverage mode via a radio link. This way, it is possible to test both, a base station and a user equipment which both form the devices under test.

The above test scenarios—in particular the test scenarios shown in FIG. 4-7—are described on the basis of the testing of user equipment 13 using wireless links, such as wireless D2D links 14 and/or wireless communication links 15. However, it should be understood that the functionality of the test apparatus is not restricted to this application and may be used to the test of a device under test which is connected to the test apparatus 10 via any sort of wireless and wired connections or links, e.g. such as a wired D2D link 14A and/or a wired connection 15A.

The wired connections 14A, 15A may be implemented in the form of cable, such as high frequency cables. It may be possible to employ only one cable for the implementation of the wired connections 14A, 15A. However, also two, four or a plurality of cables for the implementation of the wired connections 14A, 15A are possible. In this regard it may be possible to use—at least partially—one and the same physical resource(s), such as a cable, for different connections or links 14A, 15A. In particular, it may be possible—at least partially—to use the same cable(s) for the uplink (UL), downlink (DL) and/or sidelink (SL) of a communication. Further, it may alternatively or additionally be possible—at least partially—to employ the same cable for the D2D link 14A and the communication link 15A.

In a further embodiment, the test module 12, 12A is designed to test the behaviour of a user equipment under test at least under one of the following conditions:
 during D2D communication via the D2D link;
 during a communication via a radio link;
 during an in-coverage mode;
 during an out-of-coverage mode;
 during a partial coverage mode.

In the foregoing specification, the invention has been described with reference to specific examples of the embodiments of the invention. It will, however, be evident that various notifications and changes may be made therein without departing from the broader spirit and scope of the present invention as set forth in the appending claims. For example, the connections may be a type of connections suitable to transfer signals from or to the respective nodes, units or devices, for example via intermediate devices. Accordingly, unless implied or stated otherwise, the connections may be for example be direct connections or indirect connections.

For the devices implemented in the present invention are for the most part composed of electronic components and circuits known for those skilled in the art. Details of the circuitry and its components will not be explained in any greater extent than that considered necessary as illustrated above, for the understanding and appreciation of the underlying concept of the present invention and in order not to obfuscate or distract from the teachings of the present invention.

Moreover, the present invention is not limited to physical devices or units implemented in non-programmable hardware, but can also be applied in programmable devices or units able to perform the desired device functions or operating in accordance with suitable program code.

In the description, any reference signs shall not be construed as limiting the claims. The term "comprising" does not exclude the presence of other elements or steps listed in the claim. Furthermore, the terms "a" or "an" as used herein are defined as one or more than one. Also, the use of introductory phrases such as "at least one" and "one or more" in the claims should not be construed to imply that the introduction of another claim element by the indefinite articles "a" or "an" limiting any particular claim containing such introduced claim element to inventions containing only one such element. The same holds true for the use of definite articles. Unless stated otherwise, terms such as "first" and "second" are used to arbitrarily distinguish between the elements such terms describe. The mere fact that certain measures are recited in different claims does not indicate that a combination of these measures cannot be used to advantage. The order of method steps presented in a claim does not prejudice the order in which the steps can actually be carried out, unless specifically recited in the claim.

The skilled artisans will appreciate that elements in the figures are illustrated for simplicity and clarity and have not necessarily drawn to scale. For example, the chosen elements are only used to help to improve the understanding of the functionality and the arrangements of these elements in various embodiments of the present invention. Also, common but well-understood elements that are useful or necessary in a commercial and feasible embodiment are mostly not depicted in order to facilitate a less abstracted view of these various embodiments of the present invention.

The expression "user equipment" used in the present description can be understood to include any devices that have an integrated mobile communications functionality, irrespective of whether further functionalities are integrated in these devices. Thus, for instance, user equipment can be understood to include in addition to conventional mobile phones any other mobile communication terminals or mobile stations, such as smartphones, tablet PCs, mobile computers, navigational devices, PDAs (Personal Digital Assistants) and the like. Such user equipments are enabled to communicate wirelessly in a cellular communications network or wireless communication system, sometimes also referred to as a cellular radio system.

The user equipments in the present context may be, for example, portable, pocket-storable, hand-held, computer-comprised, or vehicle-mounted mobile devices, enabled to communicate voice and/or data, via the radio access network, with another entity, such as another transceiver mobile station or a server.

The cellular communications network covers a geographical area which is divided into cell areas, wherein each cell area being served by a transceiver base station, e.g. a Radio Base Station (RBS), which sometimes may be referred to as e.g. "eNB", "eNodeB", "NodeB", "B node", or BTS (Base Transceiver Station), depending on the technology and terminology used. NodeB or eNodeB refer to a UMTS and LTE terminology. The transceiver base stations may be of different classes such as e.g. macro eNodeB, home eNodeB or pico base station, based on transmission power and thereby also cell size. A cell is the geographical area where radio coverage is provided by a specific transceiver base station at a specific site. One transceiver base station situated on this site, may serve one or several cells. Further, each transceiver base station may support one or several communication technologies. The transceiver base stations communicate over the air interface operating on radio frequencies with the user equipments within range of the base stations.

GSM is an abbreviation for Global System for Mobile Communications. In 3rd Generation Partnership Project (3GPP) Long Term Evolution (LTE), base stations, which may be referred to as eNodeBs or even eNBs, may be directly connected to one or more core networks. UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for mobile stations. The 3GPP has undertaken to evolve further the UTRAN and GSM based radio access network technologies. According to 3GPP/GERAN, a mobile station has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

Furthermore, the present invention shall also not be restricted to the above-stated protocols and standards, which are merely intended to aid explanation.

LIST OF USED REFERENCE NUMBERS

1 D2D radio network
2, 2a cellular communications network
3 (transceiver) base station
4 (transceiver) base station
5 user equipment
6 user equipment
7 radio link
8 D2D communication link
9 connection
10 test apparatus
11, 11A emulation module
12, 12A test module
13 user equipment under test, device under test
14 wireless D2D link
14A wired D2D link
15 radio communication link
15A wired communication link
16 internal link
eNB radio transceiver base station
UE-IC user equipment in an out-of-coverage mode
UE-OOC user equipment in an in-coverage mode
S1-S4 steps

What we claim is:

1. A test apparatus, the test apparatus comprising:
an emulation module which is configured to emulate the functionality of a first user equipment and to establish a D2D link between the emulated first user equipment and an externally arranged second user equipment which forms a user equipment under test;
a test module which is configured to test the second user equipment after being connected to the emulated first user equipment of the emulation module via the established D2D link;
wherein the emulation module is further configured to emulate the first user equipment in an out-of-coverage mode; and
wherein the emulation module is further configured to emulate the functionality of a radio transceiver base station and to establish a radio link between the radio transceiver base station and a second user equipment and wherein the emulation module is further configured to emulate the first user equipment and the radio transceiver base station such that a communication between the emulated first user equipment and a second user equipment is based on the established D2D link and a communication between the emulated radio transceiver base station and the second user equipment is based on the radio link.

2. The test apparatus of claim 1, wherein the emulation module is further configured to establish a wireless D2D link.

3. The test apparatus of claim 1, wherein the emulation module is configured to emulate the functionality of a base station for a wired communication between the emulated base station and the second user equipment when the second user equipment is connected to the emulation module via a wired link.

4. The test apparatus of claim 1, wherein the emulation module is configured to establish at least one of:
a D2D direct communication link;
a D2D direct discovery link.

5. The test apparatus of claim 1, wherein the emulation module is further configured to emulate the first user equipment such that a communication to a second user equipment is based only on the D2D link.

6. The test apparatus of claim 1, wherein the test module comprises an RF measurement and evaluation unit which is designed to test the RF properties of the second user equipment under test if the second user equipment is wired or wireless connected to the test module.

7. The test apparatus of claim 1, wherein the test module comprises a measurement unit that is designed to measure at least one of following items of information of the second user equipment under test:
power consumption of the second user equipment under test;
data volume produced by the second user equipment under test via the D2D communication link;
data volume produced by the second user equipment under test via a radio link;

frequency or spectrum information of the transferred data from the second user equipment under test via the D2D communication link;
frequency or spectrum information of the transferred data from the second user equipment under test via a radio link;
signalling behaviour;
synchronization behaviour.

8. The test apparatus of claim 1, wherein the test module is designed to test the behaviour of a second user equipment at least under one of the following conditions:
during D2D communication via the D2D link;
during communication via a radio link;
during an in-coverage mode;
during an out-of-coverage mode;
during a partial coverage mode.

9. The test apparatus of claim 1, wherein the test module comprises an analysis or an evaluation unit which is designed to evaluate on the basis of specified parameters, signal sequences captured in a data transfer between the second user equipment under test and the first user equipment and radio transceiver base station.

10. The test apparatus of claim 1, wherein the emulation module is configured to emulate the functionality of the first user equipment and at least one further user equipment, wherein the at least one further user equipment is designed to be used during test mode as a synchronizing source for the second user equipment.

11. The test apparatus of claim 1, wherein the test module is configured to further test a radio transceiver base station which is connected to the second user equipment in an inter cell coverage mode via a radio link.

12. A test apparatus, the test apparatus comprising:
an emulation module which is configured to emulate the functionality of a first user equipment and to establish a D2D link between the emulated first user equipment and an externally arranged second user equipment which forms a user equipment under test;
a test module which is configured to test the second user equipment after being connected to the emulated first user equipment of the emulation module via the established D2D link;
wherein the emulation module is further configured to emulate the functionality of a radio transceiver base station and to establish a radio link between the radio transceiver base station and a second user equipment; and
wherein the emulation module is further configured to emulate the first user equipment in an in-coverage mode in which the emulated first user equipment is connected to the emulated transceiver base station internally via an internal link wherein the internal link serves to coordinate or synchronize communication between a second user equipment and the radio transceiver base station.

13. The test apparatus of claim 12, wherein the emulation module is further configured to emulate the first user equipment and the transceiver base station such that a direct communication to the second user equipment is based only on the D2D link.

14. The test apparatus of claim 12, wherein the emulation module is further configured to emulate the first user equipment and the radio transceiver base station such that a direct communication to the second user equipment is based on the D2D link and the radio link.

15. The test apparatus of claim 12, wherein the test module comprises an RF measurement and evaluation unit which is designed to test the RF properties of the second user equipment under test if the second user equipment is wired or wireless connected to the test module.

16. The test apparatus of claim 12, wherein the test module comprises a measurement unit that is designed to measure at least one of following items of information of the second user equipment under test:
power consumption of the second user equipment under test;
data volume produced by the second user equipment under test via the D2D communication link;
data volume produced by the second user equipment under test via a radio link;
frequency or spectrum information of the transferred data from the second user equipment under test via the D2D communication link;
frequency or spectrum information of the transferred data from the second user equipment under test via a radio link;
signalling behaviour; and
synchronization behaviour.

17. The test apparatus of claim 12, wherein the test module is designed to test the behaviour of a second user equipment at least under one of the following conditions:
during D2D communication via the D2D link;
during communication via a radio link;
during an in-coverage mode;
during an out-of-coverage mode; and
during a partial coverage mode.

18. The test apparatus of claim 12, wherein the test module comprises an analysis or an evaluation unit which is designed to evaluate on the basis of specified parameters, signal sequences captured in a data transfer between the second user equipment under test and the first user equipment and radio transceiver base station.

19. The test apparatus of claim 12, wherein the emulation module is configured to emulate the functionality of the first user equipment and at least one further user equipment, wherein the at least one further user equipment is designed to be used during test mode as a synchronizing source for the second user equipment.

20. The test apparatus of claim 12, wherein the test module is configured to further test a radio transceiver base station which is connected to the second user equipment in an inter cell coverage mode via a radio link.

21. A radio communication test apparatus for testing user equipment, the test apparatus comprising:
an emulation module which is configured to emulate the functionality of a first user equipment and to establish a wireless D2D link between the emulated first user equipment and an externally arranged second user equipment which forms a user equipment under test;
a test module which is configured to test the second user equipment after being connected to the emulated first user equipment of the emulation module via the established D2D link;
wherein the emulation module is further configured to emulate the first user equipment in an out-of-coverage mode; and
wherein the emulation module is further configured to emulate the functionality of a radio transceiver base station and to establish a radio link between the radio transceiver base station and a second user equipment and wherein the emulation module is further configured to emulate the first user equipment and the radio transceiver base station such that a communication between the emulated first user equipment and a second user equipment is based on the established D2D link and a communication between the emulated radio transceiver base station and the second user equipment is based on the radio link.

22. A method for testing user equipment by employing a test apparatus, the method comprising:
emulating the functionality of a first user equipment;
providing a second user equipment under test;
establishing a wireless or wired D2D link between the emulated first user equipment and the second user equipment;
after establishing the D2D link, testing the second user equipment;
emulating the functionality of a radio transceiver base station;
establishing a radio link between the emulated radio transceiver base station and the second user equipment; and
communicating with the second user equipment via the wireless D2D link and the radio link.

23. The method of claim 22, further comprising an out-of-coverage mode in which the emulated first user equipment is disconnected to an emulated base station.

24. The method of claim 22, further comprising:
communicating with the second user equipment only via the D2D link.

25. A method for testing user equipment by employing a test apparatus, the method comprising:
emulating the functionality of a first user equipment;
providing a second user equipment under test;
establishing a wireless or wired D2D link between the emulated first user equipment and the second user equipment;
emulating the functionality of a radio transceiver base station;
establishing a radio link between the emulated radio transceiver base station and the second user equipment;
an in-coverage mode in which the emulated first user equipment is connected to the emulated transceiver base station via an internal link wherein the internal link serves to coordinate communication between the second user equipment and the radio transceiver base station; and
after establishing the D2D link, testing the second user equipment.

26. The method of claim 25, further comprising:
emulating the first user equipment and the transceiver base station such that a direct communication to the second user equipment is based only on the wireless D2D link.

27. The method of claim 25, further comprising:
emulating the first user equipment and the radio transceiver base station such that a direct communication to the second user equipment is based on the wireless D2D link and the radio link.

28. A non-transitory computer program product comprising instructions to perform testing of a user equipment under test by emulating the functionality of a first user equipment by emulating the functionality of a first mobile cellular user device, establishing a wireless or wired D2D link between the emulated first user equipment and a provided second user equipment under test comprising a second mobile cellular user device, wherein establishing the D2D link comprises establishing the D2D link as a direct data path between the emulated first user equipment and the second user equipment, emulating the functionality of a radio transceiver base station, establishing a radio link between the emulated radio transceiver base station and the second user equipment, communicating with the second user equipment via the wireless D2D link and the radio link; and, after establishing the D2D link and the radio link, testing the second user equipment.

29. A non-transitory computer program product comprising instructions to perform testing of a user equipment under test by emulating the functionality of a first user equipment by emulating the functionality of a first mobile cellular user device, establishing a wireless or wired D2D link between the emulated first user equipment and a provided second user equipment under test comprising a second mobile cellular user device, wherein establishing the D2D link comprises establishing the D2D link as a direct data path between the emulated first user equipment and the second user equipment, emulating the functionality of a radio transceiver base station; establishing a radio link between the emulated radio transceiver base station and the second user equipment; establishing an in-coverage mode in which the emulated first user equipment is connected to the emulated transceiver base station via an internal link wherein the internal link serves to coordinate communication between the second user equipment and the radio transceiver base station; and after establishing the D2D link and the radio link, testing the second user equipment.

30. A radio communication test apparatus for testing user equipment, the test apparatus comprising:
an emulation module which is configured to emulate the functionality of a first user equipment and to establish a wireless D2D link between the emulated first user equipment and an externally arranged second user equipment which forms a user equipment under test, wherein the emulation module is configured to emulate the functionality of the first user equipment by emulating a first mobile cellular user device, and wherein the second user equipment comprises a second mobile cellular user device, and wherein the emulation module is configured:
to establish the D2D link as a direct data path between the emulated first user equipment and the second user equipment,
to emulate the functionality of a radio transceiver base station and to establish a radio link between the radio transceiver base station and a second user equipment, and
to emulate the first user equipment in an in-coverage mode in which the emulated first user equipment is connected to the emulated transceiver base station internally via an internal link wherein the internal link serves to coordinate or synchronize communication between a second user equipment and the radio transceiver base station; and
a test module which is configured to test the second user equipment after being connected to the emulated first user equipment of the emulation module via the established D2D link.

\* \* \* \* \*